Aug. 15, 1961          TSOI NING          2,996,565

ELECTRIC DRY BATTERIES

Filed July 21, 1958          2 Sheets-Sheet 1

Inventor
Tsoi Ning
By Ralph B. Stewart
Attorney

Aug. 15, 1961   TSOI NING   2,996,565
ELECTRIC DRY BATTERIES
Filed July 21, 1958   2 Sheets-Sheet 2

Inventor
Tsoi Ning,
By Ralph B. Stewart
Attorney

United States Patent Office 2,996,565
Patented Aug. 15, 1961

2,996,565
ELECTRIC DRY BATTERIES
Tsoi Ning, % K.P.O., Box 5538, Kowloon, Hong Kong
Filed July 21, 1958, Ser. No. 749,878
Claims priority, application Great Britain Aug. 8, 1957
12 Claims. (Cl. 136—132)

This invention relates to improvements in or relating to electric dry batteries.

When dry batteries are exhausted, short-circuited by becoming damp, or are leaky and allow their fluid contents to escape, there is the danger that the outer casing electrode of the battery will corrode. If the battery is in a metallic holder, e.g. an electric torch case, the holder may also corrode with the final result that it can no longer be used.

If a dry battery is enclosed in an insulating casing, apertures must be provided in the casing through which contact may be established with the electrodes of the battery, and it is one object of the present invention to provide a dry battery having such a casing in which the apertures may be made fluid tight.

According to the invention, therefore, there is provided a dry battery having a flexible, water-proof, insulating casing of sheet material substantially enclosing it, said casing of sheet material having apertures therein appropriately disposed to expose at least a part of the electrodes of the battery, and at least one current conducting terminal plate being provided on the outside of said flexible casing, which terminal plate establishes contact with one of said electrodes through the appropriate aperture and at the same time coacts with the casing in the vicinity of that aperture, and the electrode with which it is in contact, to effect a fluid tight seal of that aperture.

The sheet material can be rubber, but preferably plastic sheet material is used. At the present, to the best of my knowledge polyvinyl chloride (P.V.C.) is the most suitable material to use.

It will be appreciated that the dry battery may have several cells, and if it is desired to obtain different output voltages or currents, the battery will have more than two output terminals. The flexible casing will, therefore, have several apertures in it through which contact may be established, but it is not necessary to seal each aperture by means of a terminal plate. For example, with a multi- or single cell battery, if it is desired to establish contact with an outer casing electrode of a dry battery, the flexible casing may be arranged to fit tightly over the outer electrode at least where the aperture is provided so that the aperture is effectively and automatically sealed by the outer electrode, only one terminal plate then being necessary in the case of a single cell battery.

Generally, however, only one cell will be enclosed in the flexible casing, and it is possible to establish contact with the electrodes of the cell at the top end of the cell for example, through two apertures, each being sealed by a separate terminal plate. With this arrangement, there is the possibility that a small amount of moisture will short circuit the battery through the two terminal plates, and it is therefore, preferred to arrange the two apertures in the flexible casing respectively at the top and bottom ends of the cell to expose parts of a central electrode and an outer electrode.

Preferably the terminal plate has an embossed portion which is so dimensioned as to compress the flexible casing against the central electrode in the vicinity of the aperture exposing the central electrode. The upper part of the embossed portion may establish contact with the central electrode by means of a depressed contact portion, or by providing it with a hole whose diameter is less than the diameter of the aperture in the flexible casing, the rim of the hole being bent downwardly to form a contact flange.

In order to be able to compress the flexible casing against the central electrode, the embossed portion of the terminal plate will have a similar and slightly greater cross-section to that of the central electrode.

The terminal plate can be held in place on the battery by any convenient means. For example, the embossed portion could be crimped in a groove of the central electrode. Preferably, however, the outer dimensions of the terminal plate are slightly less than the internal dimensions of the outer electrode of the battery, and the terminal plate is held in place by bending inwardly a rim of the outer electrode to enclose the outer part of the terminal plate within a folded portion of the flexible casing. It will be appreciated that the central and outer electrodes can have any convenient cross-section.

The outer electrode may be provided with a groove or beading for limiting movement of the outer part of the terminal plate into the interior of the battery. Also, preferably the terminal plate is provided with one or more apertures through which air can escape, the part of the flexible casing covering the open end of the outer electrode being disposed adjacent the battery contents and being free to move in a space betwen the terminal plate and the batttery contents, towards the terminal plate.

There are many ways in which the flexible casing may be formed: for example two identical cup-shaped portions of plastic material may be heat-sealed together at their open ends to enclose the battery. The heat sealing can be carried out for example, by a high frequency current welding operation. It is preferred to form the flexible casing by joining together a cup-shaped portion and a disc portion each having appropriately disposed apertures through which contact may be established.

If the flexible casing fits tightly round the outer electrode, fluid from the interior of the battery cell will not be able to pass therebetween, and the apertures at the bottom end of the flexible casing will already be sealed. Contact with the outer electrode may therefore be established directly through this aperture. The area of the aperture may however, be small and although this will be satisfactory for some electrical appliances, other appliances may require a large contact area, and it is preferred, therefore, to provide a second terminal plate whose area is large compared with that of the aperture.

The second terminal plate may be secured to the battery in the same way as the above mentioned terminal plate by bending over a bottom rim of the outer electrode, but preferably the second terminal plate has a downwardly-projecting toothed flange which is bent inwardly and folded back towards its central part to grip the circumferences of the disc portion and the cup-shaped portion of the flexible casing to form a fluid tight seal therebetween, and simultaneously to seal the aperture in the disc portion.

Preferably the second terminal plate is provided with concentric corrugations, the central corrugation making contact with the outer electrode through the aperture in the disc portion whilst one of the other corrugations bears against the disc portion and urges it into contact with the closed end of the outer electrode.

There will now be described by way of example only, three preferred embodiments of the invention with reference to the accompanying drawings in which.

Figure 1:
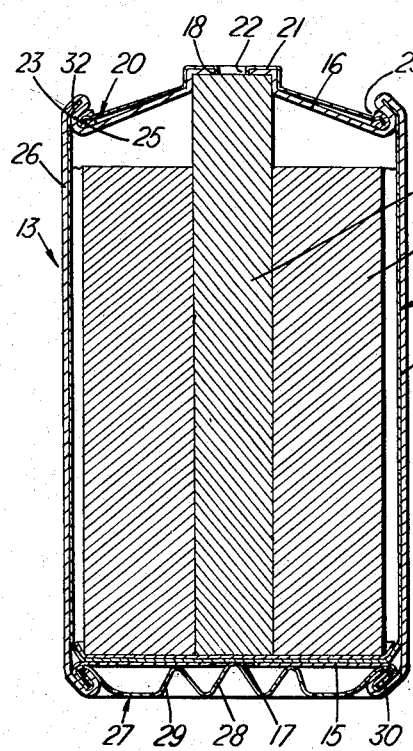
FIG. 1 is a cross-sectional view of a battery according to the invention.

With reference to FIG. 1, a cylindrical battery cell 11 having a central electrode 12 of circular cross-section is provided with a polyvinyl chloride casing 13 comprising a cup-shaped portion 14 and a disc portion 15. The disc portion and the end section 16 of the cup-shaped portion are each provided with centrally disposed apertures 17 and 18 respectively, whose diameters are less than the diameter of the central electrode. The length of the cup-shaped portion is slightly greater than the length of the battery cell, and its diameter is approximately equal to the external diameter of the cell.

The cup-shaped portion is fitted over the cell so that its end section 16 bears against the central electrode, the latter being partly exposed by the aperture 18 in the end section.

This aperture is sealed by means of a current conducting terminal plate 20 having a central embossed portion 21 whose diameter is slightly greater than the diameter of the central electrode 12, and which fits over the latter to compress the plastic casing therebetween. The upper part of the embossed portion is provided with a hole whose diameter is less than the diameter of the aperture in the end section of the plastic casing, the rim of the hole being bent downwards into an electrode-contacting flange 22.

The outer part of the terminal plate 20 is cone-shaped and terminates in an annular ridge 23 which fits into a polyvinyl chloride compression washer 25. The outer diameter of the compression washer is slightly less than the internal diameter of the outer electrode 26 of the battery, and when the terminal plate 20 is in position on the central electrode, the compression washer is below the rim of the outer electrode.

At the bottom end of the battery, a second terminal plate 27 is provided having concentric corrugations, 28 and 29, the central one 28, of which makes contact with the bottom of the outer electrode 26 through the aperture 17 in the disc portion 15 of the plastic casing. A shoulder of the outermost corrugation 29 is close to an outer downwardly projecting flange 30 (see FIG. 2) of the second terminal plate, the diameter of the flange approximating that of the outer electrode of the battery. The flange is provided with a plurality of slots 31 spaced round it so that the intermediate portions of the flange can be bent inwardly.

The diameter of the disc portion 15 of the plastic casing is greater than the diameter of the second terminal plate 27, so that its rim can be folded round both sides of the flange 30. The bottom end of the cup-shaped portion is folded round the flange in a similar manner on top of the disc portion, and welded to the disc portion by a high frequency electric current welding operation. It is preferred to perform this folding operation with heated tools so as to increase the plasticity of the plastic sheet material, and a thin washer (not shown) can be inserted in the flange 30 to prevent the ends of the plastic casing portions from springing out. The flange is then bent inwardly to grip these ends between the flange portions and the adjacent sholder of the corrugation 29 in the second terminal plate, as shown in FIG. 1.

The first terminal plate 20 is then secured to the battery by folding the upper rim 32 of the outer electrode 26 over the compression washer 25 of the first terminal plate. This folding action tends to force the compression washer towards the interior of the battery, thereby effecting a tightening action on the plastic cashing. The flexibility of the compression washer 25 serves to prevent, during this tightening action, the first terminal plate cutting through the plastic casing and short-circuiting the battery.

It will be seen that in a battery constructed in the above manner, the two apertures in the plastic casing through which contact is established with the battery electrodes are sealed, one by the central electrode 12 and the first terminal plate 20, and the other by the second terminal plate 27. The battery will, therefore, be substantially waterproof and unaffected by atmospheric humidity. Furthermore, since there is no necessity to provide a sealing layer of pitch for example on the top of the cell, the volume of the contents can be increased resulting in a corresponding increase in the life of the battery. Also the diameter of the outer electrode 26 can be made larger than that of a conventional battery, since the thickness of the plastic casing can be made less than that of conventional paper insulating casings.

Figure 3:
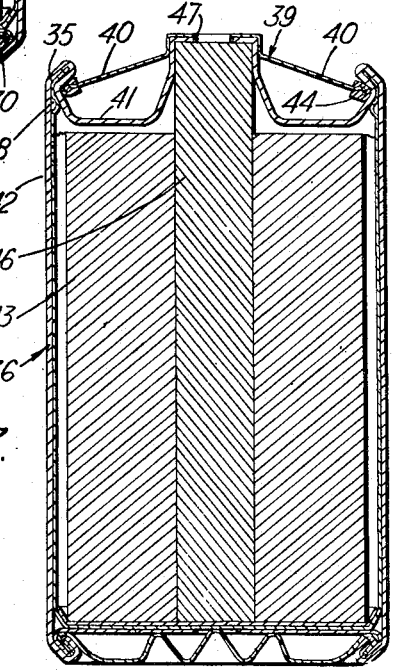
FIG. 3 is a cross sectional view of a battery provided with an expansion chamber.

In FIG. 3, there is shown a second embodiment of the invention which differs from the battery shown in FIG. 1, in the details at the top of the battery. These details only therefore, will be described.

Adjacent the top rim 35 of the outer electrode 36, a groove 38 is formed which projects into the interior of the outer electrode. The terminal plate 39 is similar to that shown in FIG. 1 except that four uniformly spaced air holes 40 are provided, the holes of each pair being arranged diametrically opposite one another.

In assembling the battery, the top end 41 of the cup-shaped portion 42 of a plastic casing is pressed down against the top of the battery contents 43 before the terminal plate 40 with its compression washer 44 is fitted onto the central electrode 46. The top rim 35 of the outer electrode is then bent inwardly forcing the rim of the terminal plate 39 downwards until the groove 38 prevents further downward movement. The terminal plate will then be firmly held in the battery cell and its flange 47 will make good contact with the top of the central electrode 46.

Figure 2:
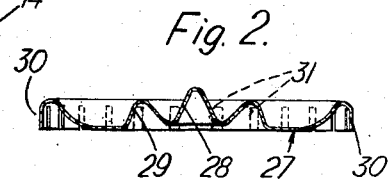
FIG. 2 is a cross sectional view of a base terminal plate for the battery shown in FIG. 1.

The bottom of the battery is finally sealed in the same manner as described with reference to FIGURES 1 and 2.

During operation of the battery shown in FIGURE 3, if the battery contents 43 should expand, part 41 of the plastic casing will be able to rise upwardly, simultaneously expelling air through air holes 40. The risk of the battery spilling its contents is, therefore, reduced.

Figure 4:
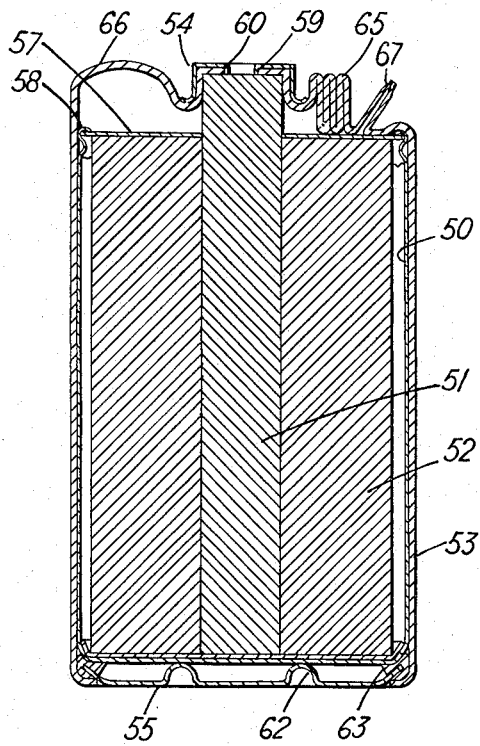
FIG. 4 is a cross sectional view of another form of battery provided with an expansion chamber, one side of the chamber being shown inflated, and the other side being shown in the form in which the battery is manufactured.

With reference to FIG. 4, there is shown a battery comprising an outer electrode 50, a central electrode 51 surrounded by battery contents 52 contained in the outer electrode 50, the battery being enclosed within a plastic casing 53, a first terminal plate 54 and a second terminal plate 55.

A plastic disc 57 is held against the battery contents 52 by bending over the rim 58 of the outer electrode.

The terminal plate 54 comprises an embossed brass cap which fits tightly over the plastic casing 53 round the central electrode 51, so as to seal the orifice 59 in the plastic casing through which a downwardly projecting rim 60 of the terminal plate 54 extends to establish contact with the central electrode 51.

The terminal plate 55 makes contact with the outer electrode 50 by means of an annular corrugation 62, and is held in position by welding a plastic ring 63 which encloses the circumference of the terminal plate 55, to the bottom rim of the plastic casing 53.

The battery is manufactured with the part of the plastic casing covering the top of the battery pleated as shown at 65, one end of a plastic tube 67 being connected to this part of the plastic casing, whilst the other end may be sealed by a suitable stopper, or by tying a knot in it, or by heat-sealing it by the application of a flame. In use, any gas generated by the battery causes the pleats to expand as shown at 66. If it is desired to release the gas, the tube 67 is unsealed, e.g. by cutting off from the free end a short length if the tube has been heat-sealed, and the pleats are reformed. The tube is then resealed as previously.

I have found that the life of a battery constructed according to the invention, whose dimensions i.e. diameter and height correspond to the dimensions of a conventional battery, can be increased by as much as 16% compared with that of the conventional battery.

It will be understood that variations and modifications of the battery described by way of example can be made without departing from the scope of the invention. Thus, for example, the central electrode could be provided with a metallic cap to prevent that electrode absorbing moisture.

I claim:

1. A dry battery comprising, a container for the cell forming an electrode, a central electrode having a free end portion, a flexible waterproof insulating casing of sheet material including a portion overlying said end portion of said central electrode and substantially enclosing said container, said casing having an aperture therein in the portion which overlies the central electrode exposing a limited area of the central electrode, a conductive terminal plate arranged outside said casing and in contact with said central electrode through said aperture, and said terminal plate compressing the casing between the terminal plate and the electrode in the vicinity of the aperture and providing a fluid tight seal between the electrode and the casing adjacent said aperture.

2. A dry battery comprising, a container for the cell forming an electrode, a central electrode having a free end portion, a flexible waterproof insulating casing of sheet material including a portion overlying said end portion of said central electrode and substantially enclosing said container, said casing having an aperture exposing a part of the end surface of the central electrode, a conductive terminal plate arranged outside said flexible casing, a portion on said plate fitting over the casing and the end portion of the electrode, means carried by said plate engaging said end surface of the central electrode through said aperture, and said plate compressing the casing around the aperture between the end surface of the central electrode and the plate to seal said aperture.

3. A dry battery according to claim 2 wherein the means carried by the plate engaging the surface of the central electrode consists of an annular flange of smaller diameter than the aperture.

4. A dry battery comprising, a container for the cell forming an electrode, a central electrode having a free end portion, a flexible waterproof insulating casing of sheet material including a portion overlying said end portion of said central electrode and substantially enclosing said container, said casing having an aperture exposing a limited area of the central electrode, a conductive terminal plate arranged outside said flexible casing, a portion on said plate fitting over the casing and the end portion of the electrode, means carried by said plate engaging said exposed surface of the central electrode through said aperture, said plate compressing the casing around the aperture between the central electrode and the plate to seal said aperture, the outer dimensions of said terminal plate being slightly less than the internal dimensions of said container, an inwardly disposed bead on said container, and the perimeter of said container and the casing being bent inwardly holding the perimeter of the plate adjacent said bead.

5. A dry battery comprising, a container for the cell forming an electrode, a central electrode having a free end portion, a flexible waterproof insulating casing of sheet material including a portion overlying said end portion of said central electrode and substantially enclosing said container, said casing having an aperture therein in the portion which overlies the central electrode exposing a limited area of the central electrode, a conductive terminal plate arranged outside said casing and in contact with said central electrode through said aperture, said terminal plate compressing the casing between the terminal plate and the electrode in the vicinity of the aperture and providing a fluid tight seal between the electrode and the casing adjacent said aperture, said casing having a second aperture exposing a limited area of the closed end of said container, a second conductive terminal plate arranged outside the casing extending over the closed end of the container, means carried by the second plate engaging the closed end of said container through said second aperture, and means securing the perimeter of said second plate to said casing.

6. A dry battery having a cell with a central electrode and a container which is closed at one end and forms another electrode comprising, a flexible water-proof insulating casing of sheet material substantially enclosing said cell, said flexible casing of sheet material covering the open end of said container and having an aperture therein disposed to expose a part of the central electrode, a terminal plate outside said flexible casing, said terminal plate being in contact with said central electrode through said aperture in the flexible casing and coacting with the casing in the vicinity of that aperture to compress the casing between the terminal plate and the central electrode to provide a fluid tight seal of that aperture, a part of the flexible casing covering the open end of the container being initially disposed adjacent the contents of the container and being arranged to expand by gas generated by the cell during operation thereof.

7. A dry battery as claimed in claim 6 in which the terminal plate is provided with an aperture through which air can escape, the part of the flexible casing covering the open end of the container being free to move in a space between the terminal plate and the contents of the container and towards the terminal plate.

8. A dry battery as claimed in claim 6 in which one end of a plastic tube is connected to the part of the flexible casing covering the open end of the container, the free end of said tube being sealed but adapted to be readily unsealed and re-sealed in order to release gas from inside the container.

9. A dry battery comprising, a cell with a central electrode and a container which is closed at one end and forms a second electrode, a flexible water-proof insulating casing of sheet material substantially enclosing said cell, said flexible casing of sheet material covering the open end of said container and having an aperture therein disposed to expose a part of the central electrode, a terminal plate outside said flexible casing, said terminal plate being in contact with said central electrode through said aperture in the flexible casing and coacting with the casing in the vicinity of that aperture to compress the casing between the terminal plate and the central electrode to provide a fluid tight seal of that aperture, said flexible casing having a second aperture adjacent the closed end of said container, a second terminal plate in contact with the container through the second aperture and provided with an outwardly projecting toothed flange bent inwardly and folded back towards the central part of the second terminal plate so as to grip a circumferential portion of the flexible casing therebetween.

10. A dry battery as claimed in claim 9 in which the diameter of the second aperture is substantially less than the diameter of said container.

11. A dry battery as claimed in claim 9 in which the diameter of said second aperture is substantially less than the diameter of said container, and the second terminal plate is provided with concentric corrugations, the central corrugation making contact with said second electrode through said second aperture while one of the other corrugations bears against the flexible casing around said second aperture and urges the flexible casing into contact with the closed end of said container.

12. A dry battery comprising, a cell with a central electrode and a container closed at one end and forming a second electrode, a flexible water-proof insulating casing of sheet material substantially enclosing said cell, said flexible casing of sheet material covering the open end of said container and having an aperture therein disposed to expose a part of the central electrode, a terminal plate outside said flexible casing, said terminal plate being in contact with said central electrode through said aperture and coacting with the casing in the vicinity of said aperture to compress the casing between the terminal plate and the central electrode to provide a fluid tight seal of that aperture, the outer dimensions of the termnal plate being slightly less than the internal dimensions of said container, said terminal plate being held in position by compressing part of the flexible casing around the outer rim of the terminal plate between an internal groove in said container and the rim of the container which is bent inwardly, the part of the flexible casing covering the open end of the container being initially disposed adjacent the contents of the container and being so arranged that it can be expanded by gas generated by the cell so as to move towards said terminal plate, said flexible casing having a second aperture adjacent to the closed end of said container, a second terminal plate provided with an inwardly projecting toothed flange which is bent inwardly and folded back towards the central part of the second terminal plate so as to grip a circumferential portion of the flexible casing therebetween.

References Cited in the file of this patent

UNITED STATES PATENTS

| | | |
|---|---|---|
| 2,427,561 | Keller | Sept. 16, 1947 |
| 2,592,439 | Lee | Apr. 8, 1952 |
| 2,595,963 | Lewis et al. | May 6, 1952 |
| 2,642,471 | Reinhardt et al. | June 16, 1953 |
| 2,802,042 | Anthony et al. | Aug. 6, 1957 |

FOREIGN PATENTS

| | | |
|---|---|---|
| 710,603 | Great Britain | June 16, 1954 |